US006671116B2

(12) United States Patent
Akagi et al.

(10) Patent No.: US 6,671,116 B2
(45) Date of Patent: *Dec. 30, 2003

(54) MAGNETIC RECORDING SYSTEM INCLUDING MAGNETIC RECORDING MEDIUM HAVING THREE-DIMENSIONAL RANDOM ORIENTATION OF AXIS OF EASY MAGNETIZATION

(75) Inventors: Fumiko Akagi, Fuchu (JP); Masukazu Igarashi, Kawagoe (JP); Kazuetsu Yoshida, Hidaka (JP); Akira Ishikawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/044,929

(22) Filed: Jan. 15, 2002

(65) Prior Publication Data

US 2002/0089771 A1 Jul. 11, 2002

Related U.S. Application Data

(63) Continuation of application No. 09/435,036, filed on Nov. 5, 1999, now Pat. No. 6,456,448.

(30) Foreign Application Priority Data

Nov. 9, 1998 (JP) .......................................... 10-317231

(51) Int. Cl.[7] .................................................. G11B 5/02
(52) U.S. Cl. ...................................................... 360/55
(58) Field of Search .......................... 360/55, 313, 324, 360/326, 324.1, 324.2, 318.1, 134; 428/329, 641, 655, 694 T, 694 TS

(56) References Cited

U.S. PATENT DOCUMENTS 4,425,401 A   1/1984   Ido et al. ................... 428/329
4,652,499 A   3/1987   Howard (List continued on next page.)

FOREIGN PATENT DOCUMENTS

JP    62-257618    11/1987
JP    63-197018    8/1988

OTHER PUBLICATIONS

W. Brown, Jr., "Thermal Fluctuations of a Single–Domain Particle", *Physical Review*, vol. 130, No. 5, Jun. 1, 1963, pp. 1677–1686.

Y. Kanai et al., "Simulation of Magnetic Aftereffect in Particulate Recording Media", *IEEE Transactions on Magnetics*, vol. 27, No. 6, Nov. 1991, pp. 4972–4974.

P. Lu et al., "Thermal instability at 10 Gbit/in$^2$ magnetic recording", *IEEE Transactions on Magnetics*, vol. 30, No. 6, Nov. 1994, pp. 4230–4232.

*Primary Examiner*—David Hudspeth
*Assistant Examiner*—Varsha A. Kapadia
(74) *Attorney, Agent, or Firm*—Antonelli, Terry, Stout & Kraus, LLP

(57) ABSTRACT

A magnetic recording system includes a magnetic recording medium including a magnetic layer, the magnetic layer being composed of magnetic grains, and a magnetic head including a recording unit and a reproducing unit. An orientation of an axis of easy magnetization of the magnetic grains is three-dimensionally distributed. An average angle between a direction of an axis of easy magnetization of each of the magnetic grains and a surface of the magnetic recording medium is within a range of 20° to 30°. A squareness ratio Mr/Ms of a remanent magnetization Mr of the magnetic recording medium to a saturation magnetization Ms of the magnetic recording medium is equal to 0.5 or more and is equal to 0.6 or less. A recording density of information which is recorded onto the magnetic recording medium is equal to 360 kfci or more.

4 Claims, 6 Drawing Sheets

U.S. PATENT DOCUMENTS

| | | | |
|---|---|---|---|
| 4,715,890 A | 12/1987 | Ovshinsky et al. | 75/0.5 AA |
| 4,902,583 A | 2/1990 | Brucker et al. | 428/665 |
| 5,021,909 A * | 6/1991 | Shiiba | 324/252 |
| 5,277,977 A * | 1/1994 | Tokuoka et al. | 428/402 |
| 5,406,433 A | 4/1995 | Smith | 360/113 |
| 5,510,172 A | 4/1996 | Araki et al. | 428/213 |
| 5,875,082 A | 2/1999 | Takayama et al. | 360/131 |
| 5,949,600 A | 9/1999 | Akiyama et al. | 360/55 |
| 6,001,447 A * | 12/1999 | Tanahashi et al. | 428/694 TS |
| 6,017,605 A * | 1/2000 | Yamazaki et al. | 360/135 |
| 6,038,108 A | 3/2000 | Dee et al. | 360/121 |
| 6,146,740 A * | 11/2000 | Birukawa et al. | 204/192.2 |
| 6,251,532 B1 * | 6/2001 | Futamoto et al. | 428/694 T |

* cited by examiner

MAGNETIC RECORDING SYSTEM INCLUDING MAGNETIC RECORDING MEDIUM HAVING THREE-DIMENSIONAL RANDOM ORIENTATION OF AXIS OF EASY MAGNETIZATION

CROSS-REFERENCE TO RELATED APPLICATION

This application is a continuation of application Ser. No. 09/435,036 filed on Nov. 5, 1999, now U.S. Pat. No. 6,456,448, the contents of which are hereby incorporated herein by reference in their entirety.

BACKGROUND OF THE INVENTION

1. Field of the Invention

The invention relates to a magnetic recording system suitable for high density recording and, more particularly, to a magnetic recording system having a recording density of 10 Gigabits or more per square inch.

2. Description of the Related Art

The realization of a large capacity is required more and more in a magnetic disk apparatus serving as an external magnetic recording system of a computer. To realize the large capacity, in a magnetic head of the magnetic recording system, a recording unit and a reproducing unit are separated, an electromagnetic induction type magnetic head is used in the recording unit, a magneto-resistance effect type head is used in the reproducing unit, and a combination head in which these two heads are combined is used. According to the magneto-resistance effect type head, since a reproducing sensitivity is higher than that of the conventional electromagnetic induction type head, a recording bit becomes fine, and even if a leakage flux decreases, a sufficiently high reproduction output can be obtained. The development of a giant magneto-resistance effect type head of a spin valve type having an even higher reproducing sensitivity is also progressing. A magnetic recording medium is constructed by a Co alloy magnetic layer made of CoCrTa, CoCrPt, or the like, and a Cr underlayer to control crystal orientation of the magnetic layer. The Co alloy magnetic layer has a hexagonal close packed (hcp) lattice structure in which a c axis is used as an axis of easy magnetization, and it is considered to be desirable that the direction of the axis of easy magnetization is isotropically oriented in the plane of the magnetic recording medium as for an in-plane magnetic recording medium, and methods of improving the orientation of the direction of the easy axis of magnetization in the plane of the magnetic recording medium (JP-A-62-257618, JP-A-63-197018) have been proposed. In the case of using the magneto-resistance effect type head as a reproducing head, the further reduction of noises than the conventional ones is required for the medium in order to reproduce not only a signal of the medium but also the noises at a high sensitivity. The medium noises are mainly caused by a disturbance of magnetization in a magnetization transition region between the recording bits, and the narrowing of such a region contributes to the reduction of the medium noises. For this purpose, it is effective to make magnetic particles of the magnetic film of the medium fine. When the magnetic particles are made fine, however, the magnetization thermally fluctuates, and the recorded magnetization is attenuated with the elapse of time. Generally, it is known that as a value $Ku \cdot V/k \cdot T$ obtained by dividing the product of a magnetic anisotropy constant Ku and a volume V of a particle by the product of the Boltzmann constant k and a temperature T decreases, thermal instability increases (P. Lu et al., "Thermal instability at 10 Gbit/in$^2$ magnetic recording", *IEEE Transactions on Magnetics,* Vol. 30, No. 6, November 1994, pp. 4230–4232). Although it is accordingly desirable to use a material having a large Ku to obtain thermal stability, in the conventional medium, the larger the value of Ku is, the more a magnetic anisotropy magnetic field Hk increases, so that a coercive force Hc of the medium also increases. Generally, however, it is known that, as a magnetic field of the head upon recording, a magnetic field which is 1.5 to 2 times as high as Hc is needed at the center of the film thickness of the medium. According to the ability of the current magnetic head, as the coercive force Hc of the medium increases, recording becomes impossible. It is therefore necessary to realize a medium such that Ku is large so that thermal stability is obtained, Hc according to the ability of the recording head is obtained, and a high output signal to noise ratio (S/N ratio) is obtained even in high density recording.

SUMMARY OF THE INVENTION

To realize a magnetic recording system suitable for high density magnetic recording, the realization of fine magnetic particles of the magnetic layer of the medium is necessary to reduce noises. An influence by a thermal fluctuation in association with it, however, causes a problem that magnetization is attenuated with the elapse of time. It is sufficient to select a medium material of a large anisotropy constant Ku as one of means for suppressing the influence by the thermal fluctuation. In the conventional technique, the material having large Ku simultaneously shows a high coercive force Hc. However, although an enough large head magnetic field is necessary to record to the medium of high Ku (high Hc), it is becoming difficult to generate an enough magnetic field according to the ability of the current head. According to the invention, even if Ku is increased, Hc can be reduced, so that the thermal fluctuation can be suppressed and a further high signal output to noise ratio (S/N ratio) can be maintained. Particularly, a magnetic recording system suitable to accomplish the recording density of 10 Gigabits or more (magnetization transition length is equal to 70 nm or less) per square inch can be provided.

According to the invention, there is provided a magnetic recording system comprising a magnetic recording medium having a magnetic layer formed on a substrate through an underlayer; a driving unit for driving the medium in the recording direction; a magnetic head constructed by a recording unit and a reproducing unit; means for moving the magnetic head relative to the magnetic recording medium; and recording and reproduction signal processing means for performing a signal input to the magnetic head and an output signal reproduction from the magnetic head, wherein the reproducing unit of the magnetic head is constructed by a magneto-resistance effect type head and has a recording magnetization pattern in which a magnetization transition length of the magnetic recording medium is equal to 70 nm or less, the direction of an axis of easy magnetization of the magnetic particles in the magnetic layer of the magnetic recording medium is three-dimensionally distributed (an axis of easy magnetization is inclined in the film thickness direction relative to the film surface), and a squareness ratio (Mr/Ms) which is a ratio of a remanent magnetization Mr to a saturation magnetization Ms which are measured by applying the maximum magnetic field of the magnetic head in the direction of relative movement between the magnetic head and the magnetic recording medium is set to a value within a range from 0.5 to 0.6, thereby enabling Hc to be reduced even if Ku is increased, so that a thermal fluctuation is suppressed and a higher recording density can be achieved. The reason why Hc can be reduced even if Ku is increased is as follows. Generally, when an angle which is formed by the direction of the axis of easy magnetization and the head magnetic field direction is equal to 45° or less, as such an angle increases, a magnetization reversal occurs in a weak magnetic field. By three-dimensionally distributing the direction of the axis of easy magnetization, the average angle between the direction of the head magnetic field and the direction of the axis of easy magnetization increases. Therefore, even if Ku is large, the increase in Hc can be suppressed as compared with a medium in which the direction of the axis of easy magnetization is two-dimensionally distributed. A degree of the orientation of the axis of easy magnetization is reflected in Mr/Ms, and when Mr/Ms is equal to 0.5, this corresponds to a state in which the direction of the axis of easy magnetization is perfectly three-dimensionally distributed. In the present invention, a range of 0.5 to 0.6 as a value of Mr/Ms corresponds to a region having an orientation that is slightly dominant in the in-plane direction as compared to the perfect three-dimensional random orientation.

DETAILED DESCRIPTION OF THE EMBODIMENTS

Embodiment 1

Figure 1:
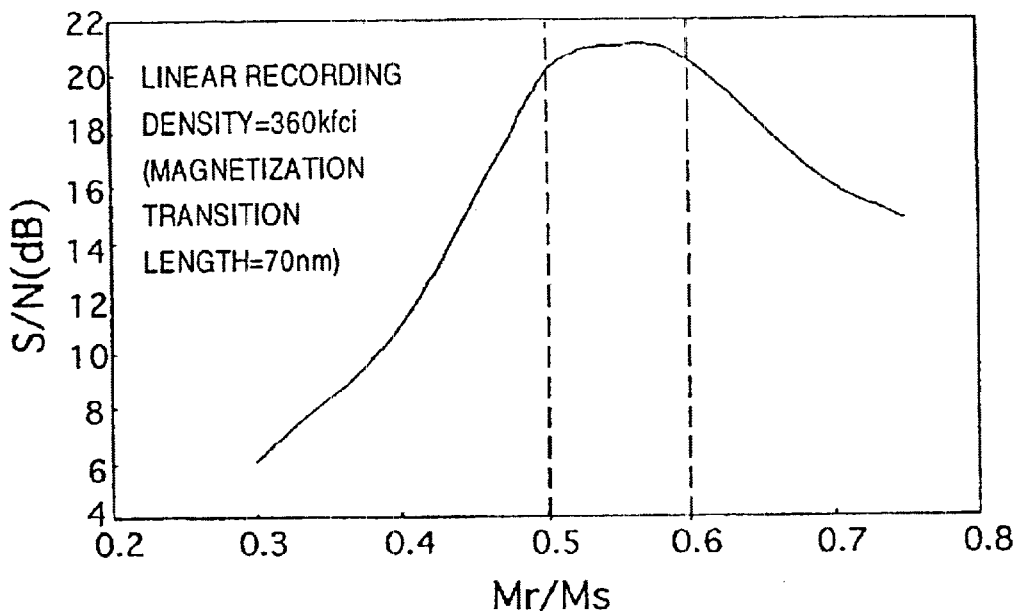
FIG. 1 shows a result in the case where an Mr/Ms (Mr: remanent magnetization, Ms: saturation magnetization) dependency of an S/N ratio (S: reproduction output, N: noises) of a magnetic recording system of the embodiment 1 and S/N ratios of values of Mr/Ms except that of the embodiment are calculated by a Langevin equation and compared.
Figure 3:
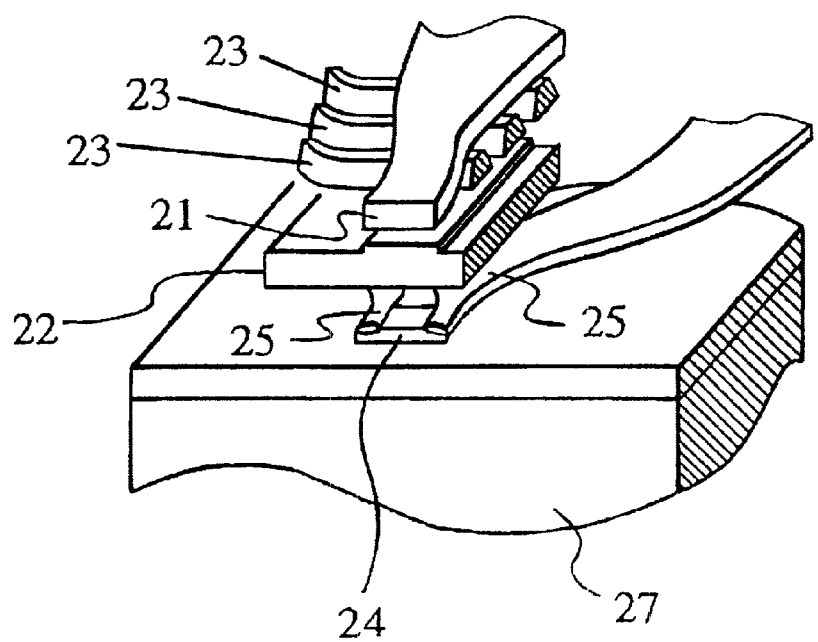
FIG. 3 is a schematic solid view showing a cross sectional structure of a magnetic head in the magnetic recording system of the invention.
Figure 2A:
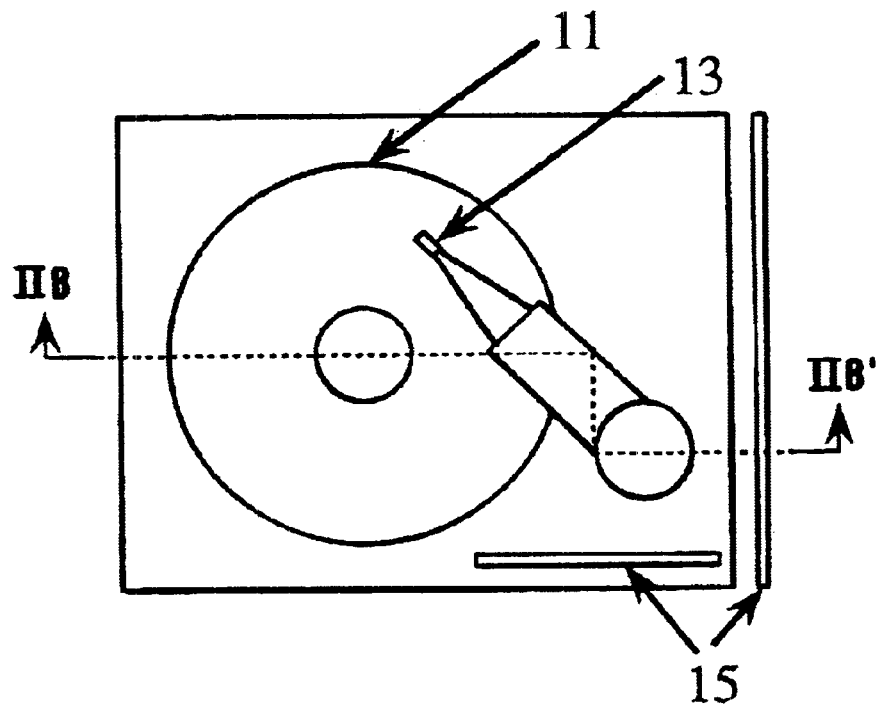
FIG. 2A is a schematic plan view of the magnetic recording system of the embodiment of the invention.
Figure 2B:
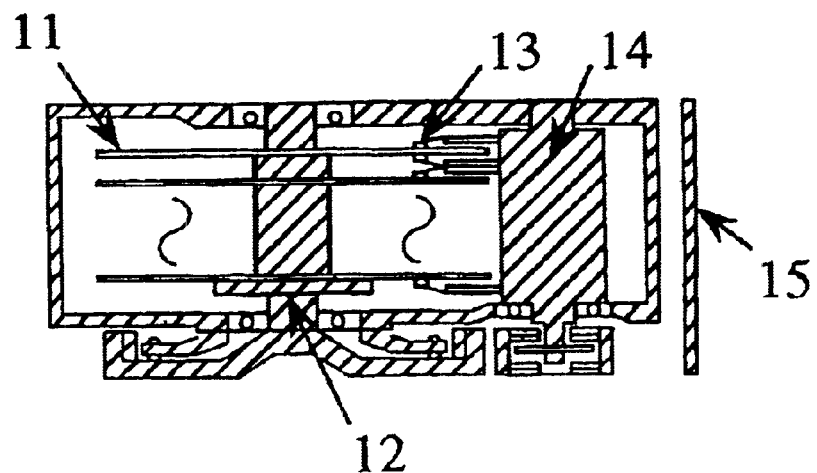
FIG. 2B is a schematic cross sectional view taken along the line IIB–IIB' in FIG. 2A.
Figure 4:
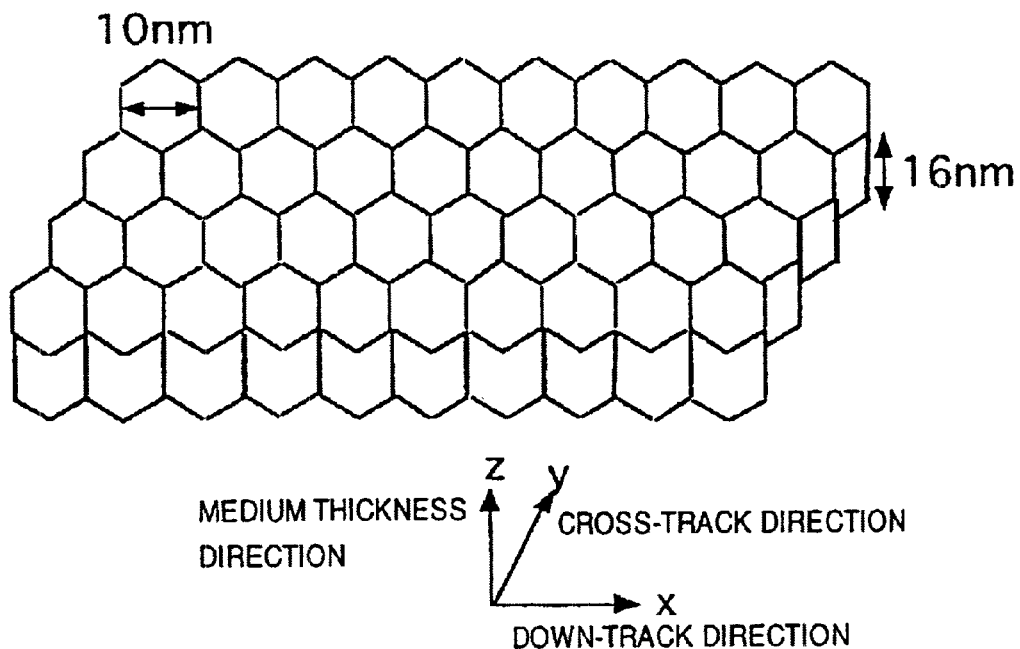
FIG. 4 shows a medium shape in the embodiment 1.
Figure 5:
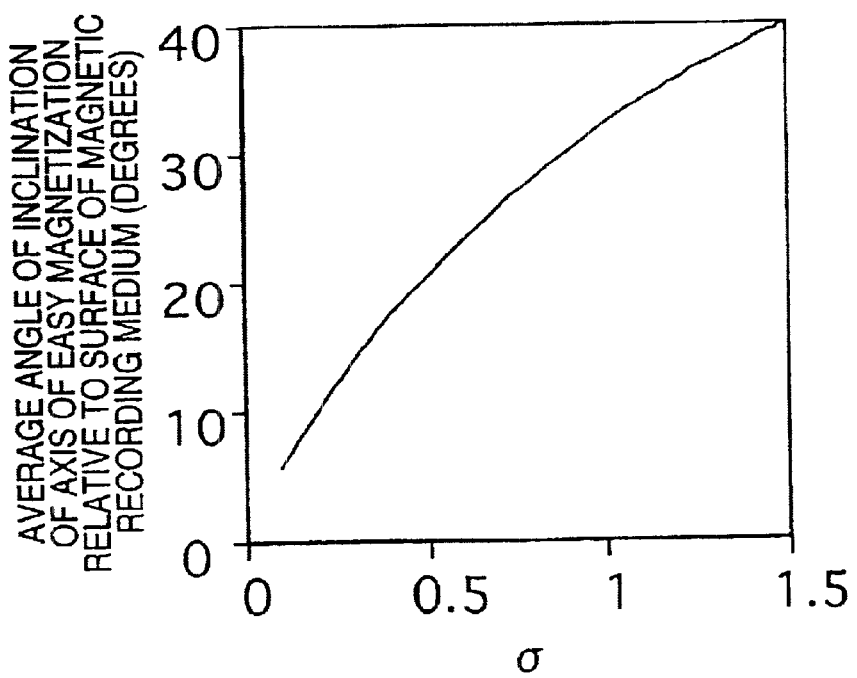
FIG. 5 shows the relation between $\sigma$ and the average value of angles at which the axis of easy magnetization is inclined in the film thickness direction of the medium in case of assuming that an orientation distribution of an axis of easy magnetization is expressed by $x^2+y^2+z^2/\sigma=1$ (x: component in the track travelling direction of the axis of easy magnetization, y: component in the track width direction, z: component in the film thickness direction)
Figure 6:
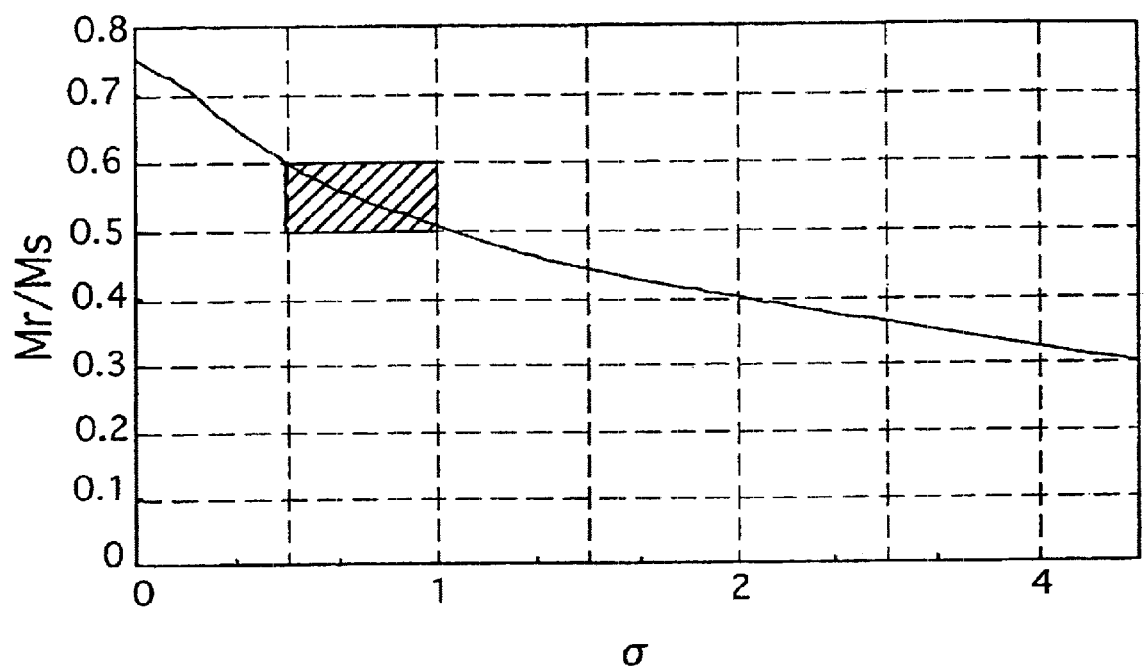
FIG. 6 shows the relation between $\sigma$ and Mr/Ms (Mr: remanent magnetization, Ms: saturation magnetization) in case of assuming that the orientation distribution of the axis of easy magnetization is expressed by $x^2+y^2+z^2/\sigma=1$ (x: component in the track travelling direction of the axis of easy magnetization, y: component in the track width direction, z: component in the film thickness direction)
Figure 7:
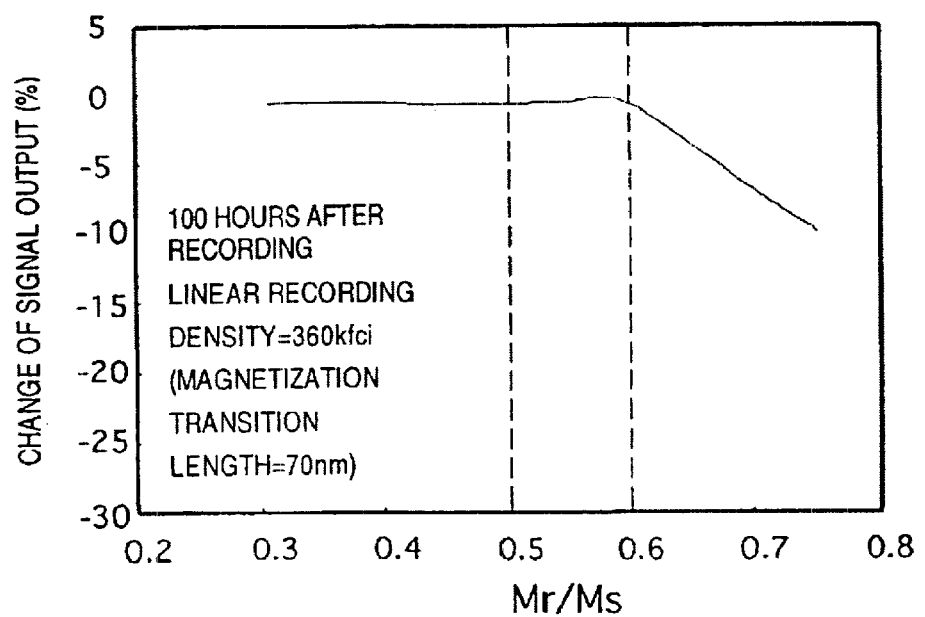
FIG. 7 shows a result in the case where an Mr/Ms (Mr: remanent magnetization, Ms: saturation magnetization) dependency of a change ratio of a reproduction output after the elapse of 100 hours of the reproduction output in the magnetic recording systems of the embodiment 1 and except that of the embodiment are calculated by a Monte Carlo method and compared.

FIGS. 2A and 2B respectively show a schematic plan view and a schematic cross sectional view of a magnetic recording system of an embodiment 1. The system is a magnetic recording system having a well-known structure comprising a magnetic recording medium 11; a driving unit 12 for rotating the magnetic recording medium 11; a magnetic head 13; driving means 14 for driving the magnetic head 13; and a recording and reproduction signal processing means 15 for the magnetic head. FIG. 3 shows a schematic diagram of a structure of the magnetic head of the magnetic recording system. The magnetic head is a recording/reproduction separation type head in which an electromagnetic inductive type magnetic head for recording formed on a magnetic head slider substrate 27 and a magneto-resistance effect type head for reproduction are combined. The recording magnetic head is an inductive type thin film magnetic head comprising a pair of recording magnetic poles 21 and 22 and coils 23 which intersect them. The reproducing magnetic head is a magneto-resistance effect type head comprising a magneto-resistance effect sensor 24 and a conductive layer 25 serving as an electrode. A gap layer and a shield layer between the recording magnetic poles are omitted in FIG. 3. A head gap length gl of the electromagnetic inductive type magnetic head for recording is equal to 0.2 $\mu$m and a shield interval is equal to 0.2 $\mu$m. Under such system conditions, in order to clarify medium magnetic characteristics and a medium structure which can solve the above problems, various examinations were made by using a magnetic recording simulator. Particularly, the relations among a distribution of an axis of easy magnetization of the medium, recording and reproducing characteristics, and an aging change of a reproduction output were examined, so that it has been found that the problems can be solved by a medium having characteristics which will be explained hereinbelow. The details are described below. The magnetic recording simulator is based on a magnetic recording calculating program using a Langevin equation (W. Brown, Jr., "Thermal Fluctuations of a Single-Domain Particle", *Physical Review*, Vol. 130, No. 5, Jun. 1, 1963, pp. 1677–1686) and a calculating program of an aging change of the reproduction output using a Monte Carlo method (Y. Kanai et al., "Simulation of Magnetic Aftereffect in Particulate Recording Media", *IEEE Transactions on Magnetics,* Vol. 27, No. 6, November 1991, Pp. 4972–4974). A particle shape of the medium has an ultrafine hexagonal prism structure having a diameter of 10 nm and a film thickness ($\delta$) of 16 nm as shown in FIG. 4 and the particles are arranged without a gap. A magnetic anisotropy of the particles is a uniaxial anisotropy and an orientation distribution of the axis of easy magnetization is considered to be an ellipsoid of $x^2+y^2+z^2/\sigma^2=1$. (x, y, z) respectively denote a component in the track travelling direction (down-track direction) of the axis of easy magnetization, a component in the track width direction (cross-track direction), and a component in the film thickness direction (medium thickness direction). $\sigma$ is an arbitrary constant which controls the orientation of the axis of easy magnetization relative to the film thickness direction. FIG. 5 shows results in which a and the average value of angles at which the axis of easy magnetization is inclined in the film thickness direction are shown as a graph. The angles were measured relative to the film surface. Thus, a medium such that as σ is closer to 0, the axis of easy magnetization is distributed at random parallel to the film surface and is hardly oriented in the film thickness direction is obtained. When σ=1, this means that the axis of easy magnetization is three-dimensionally distributed at random (three-dimensional random orientation). If σ is larger than 1, this means that the orientation distribution of the axis of easy magnetization is deviated toward the film thickness direction. The saturation magnetization Ms is set to be constant (Ms=0.65T). The magnetic anisotropy constant Ku is set to a large value within a range of 1.0 to $2.2=10^5$ J/m$^3$ as the average angle of the orientation of the axis of easy magnetization is inclined in the film thickness direction so that the coercive force Hc and remanent magnetization Mr of the medium are also set to be constant (Hc=250 kA/m, Mr=0.35T, Mr·=5.6 Tnm). The magnitude Hc=250 kA/m of the coercive force is a value obtained by assuming that as a result that the head structure is drawn by a schematic diagram and a head magnetic field is measured by a three-dimensional magnetostatic field analysis simulator, since the maximum magnetic field intensity is equal to 500 kA/m, if the coercive force has a value of ½ of it, recording can be sufficiently performed. Under the above conditions, the relation between the parameter a which controls the inclination of the axis of easy magnetization and Mr/Ms is obtained and the result is shown in FIG. 6. It has consequently been discovered that as the average angle of the axis of easy magnetization has a larger inclination in the film thickness direction, namely, as the axis of easy magnetization is more three-dimensionally distributed, Mr/Ms decreases. Recording and reproducing characteristics and thermal fluctuating characteristics are calculated by using the medium having the above magnetic characteristics and the foregoing head. A spacing between the head and the medium at the time of recording/reproduction is set to 45 nm. FIG. 1 shows results of calculations with respect to the relation between the ratio (S/N) of the reproduction output to noises and Mr/Ms in case of a recording density of 360 kfci (kilo flux changes per inch) (magnetization transition length=70 nm). Thus, when Mr/Ms lies within a range from 0.5 to 0.6, the S/N ratio has almost the peak value, and when Mr/Ms is equal to 0.5 or less or is equal to 0.6 or more, the S/N ratio decreases. Further, when the recording density is equal to 360 kfci, although an S/N ratio of 20 dB or more is needed, it has been found that this condition is satisfied when 0.5≦Mr/Ms≦0.6. subsequently, FIG. 7 shows the reproduction output just after recording in the case where recording and reproduction are performed at a recording density of 360 kfci (magnetization transition length=70 nm) and a change (%) of the reproduction output after the medium was left at room temperature (300K) for 100 hours (time-decay of the reproduction output). Thus, it has been found that when Mr/Ms is equal to 0.6 or less, the reproduction output hardly changes, and when Mr/Ms is equal to more than 0.6, the reproduction output decreases. This is because it is considered that since Ku decreases in association with an increase in Mr/Ms, a thermal stability factor Ku·V/k·T (Ku: magnetic anisotropy constant, V: volume of a particle, k: the Boltzmann constant, T: temperature) also decreases, and the recording magnetization is influenced by the thermal fluctuation and is demagnetized. Consequently, at the recording density of 360 kfci, by using the medium in which the axis of easy magnetization of particles is three-dimensionally distributed so as to have an average angle of inclination of 20° to 30° (Mr/Ms lies within a range Of 0.5 to 0.6) in the film thickness direction relative to the film surface, a preferred system which has an excellent thermal stability resistance and an S/N ratio which is equal to 20 dB or more can be obtained. This invention assumes embodiment 1. A point that the calculation results almost match the experimental results is shown in the next embodiments 2 and 3.

Embodiment 2

In a magnetic recording system of an embodiment 2, the head having the same specification as that of the embodiment 1 is used.

The magnetic recording system is formed by using an RF magnetron sputtering method. A glass substrate is used as a substrate, a substrate temperature is set to 280° C., and an underlayer made of SiO$_2$ or Al$_2$O$_3$ having a thickness of 0.1 gm is formed on the substrate. Subsequently, an argon gas of 5 mTorr is introduced, an electric power of 0.7 kW/cm$^2$ is applied, and a magnetic layer made of CoCrPt having a thickness (δ) of 16 nm is formed. A carbon film having a thickness of 6 nm is further formed as a protection layer on the magnetic layer. Magnetic characteristics of the medium formed in this manner are measured by using a VSM (vibration sample type magnetometer) by applying a recording magnetic field of the magnetic head to the medium in the direction of relative motion between the magnetic head and the magnetic recording medium. In the case of using SiO$_2$ as an underlayer, the saturation magnetization Ms=0.65T, the remanent magnetization Mr=0.35T, and the squareness ratio Mr/Ms=0.54. Therefore, the product Mr·δ of the film thickness and the remanent magnetization is equal to Mr·δ=5.6 Tnm. The coercive force Hc is equal to 250 kA/m by the measurement using the same VSM. A magnitude of the magnetic anisotropy constant Ku obtained by the magnetic torque method is equal to $1.8 \times 10^5$ J/m$^3$ and is larger than that of the conventional medium. The value obtained by dividing the sum of the observation particle areas of the medium particles by the number of observation particles is set to an average area (=100 nm$^2$) of the crystal particles and a thermal stability factor Ku·V/k·T is obtained by using a TEM (Transmission Electron Microscope), so that it is equal to 70 at room temperature (T=300K). As a result of examining diffraction peaks by using a reflection X-ray diffraction method, although peaks were found in both of the [110] orientation and the [001] orientation, a particularly dominant orientation was not found. Therefore, it has been confirmed that the medium in which the direction of the axis of easy magnetization of the magnetic particles of the magnetic layer is three-dimensionally distributed is obtained. Magnetic characteristics of the medium formed by using Al$_2$O$_3$ as an underlayer are similarly measured by the VSM, so that the saturation magnetization Ms=0.66T, the remanent magnetization Mr=0.35T, and the squareness ratio Mr/Ms=0.53. Therefore, the product Mr·δ of the film thickness and the remanent magnetization is equal to Mr·δ5.6 Tnm. The coercive force Hc is equal to 260 kA/m by the measurement using the same VSM. A magnitude of the magnetic anisotropy constant Ku obtained by the magnetic torque method is equal to $1.8 \times 10^5$ J/m$^{3.}$ The value obtained by dividing the sum of the observation particle areas of the medium particles by the number of observation particles is set to an average area (=100 nm$^2$) of the crystal particles and a thermal stability factor Ku·V/k·T is obtained by using a TEN (Transmission Electron Microscope), so that it is equal to 70 at room temperature (T=300K). As a result of examining diffraction peaks by using a reflection X-ray diffraction method, although peaks were found in both of the [110] orientation and the [001] orientation, a particularly dominant orientation was not found. Therefore, it has been confirmed that the medium in which the direction of the axis of easy magnetization of the magnetic particles of the magnetic layer is three-dimensionally distributed is obtained.

Figure 8:
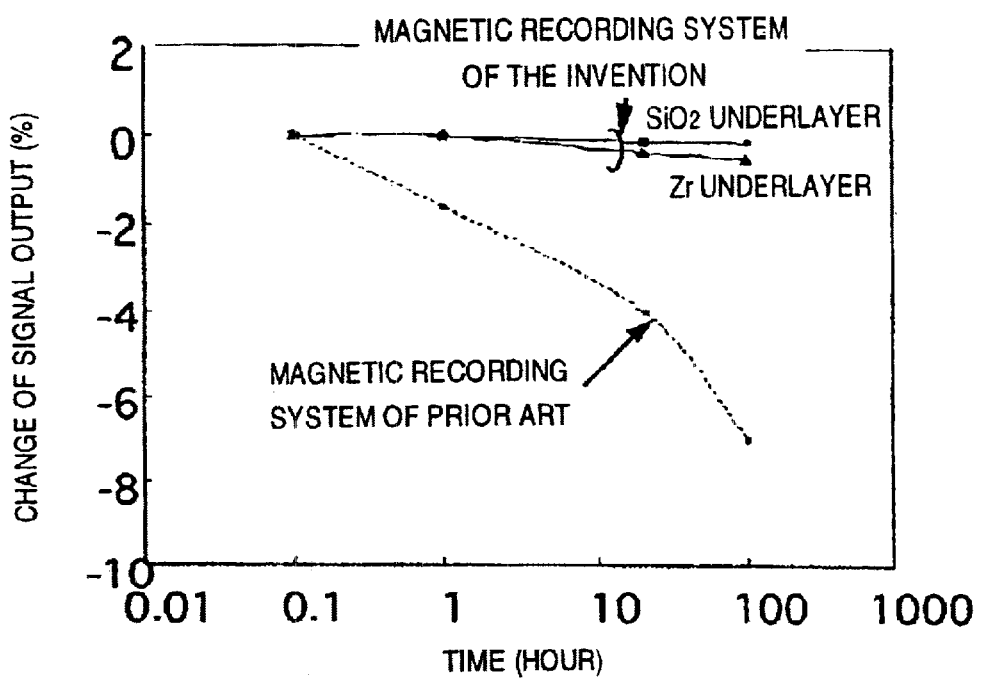
FIG. 8 shows results in the case where time decay of the reproduction output in magnetic recording systems in the embodiments 2 and 3 is compared with those of the conventional magnetic recording system.
Figure 9:
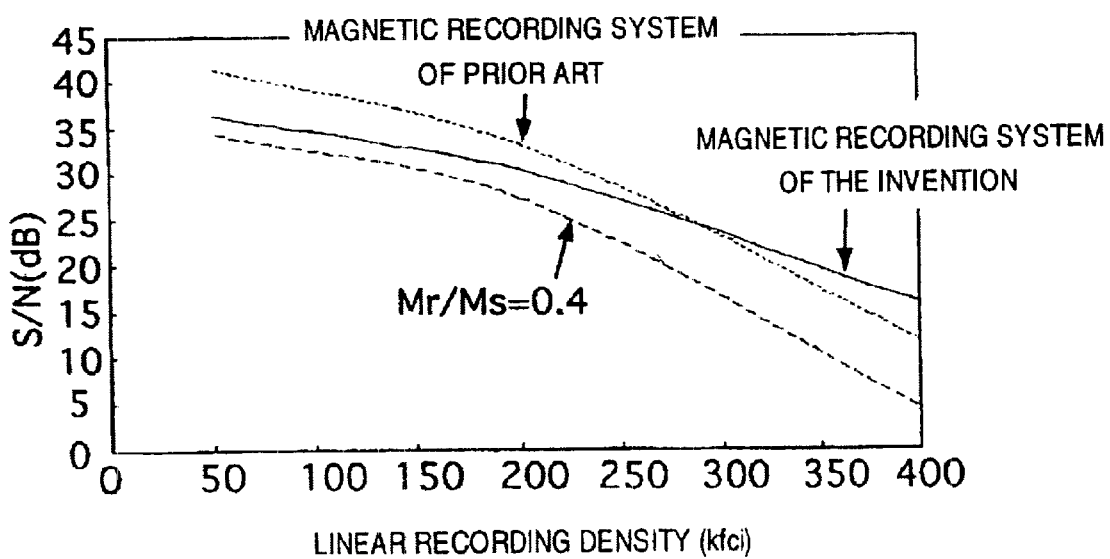
FIG. 9 shows results in the case where the recording density dependency of the S/N ratio in the magnetic recording system in the embodiment 2 is compared with that of the conventional magnetic recording system.
Figure 10:
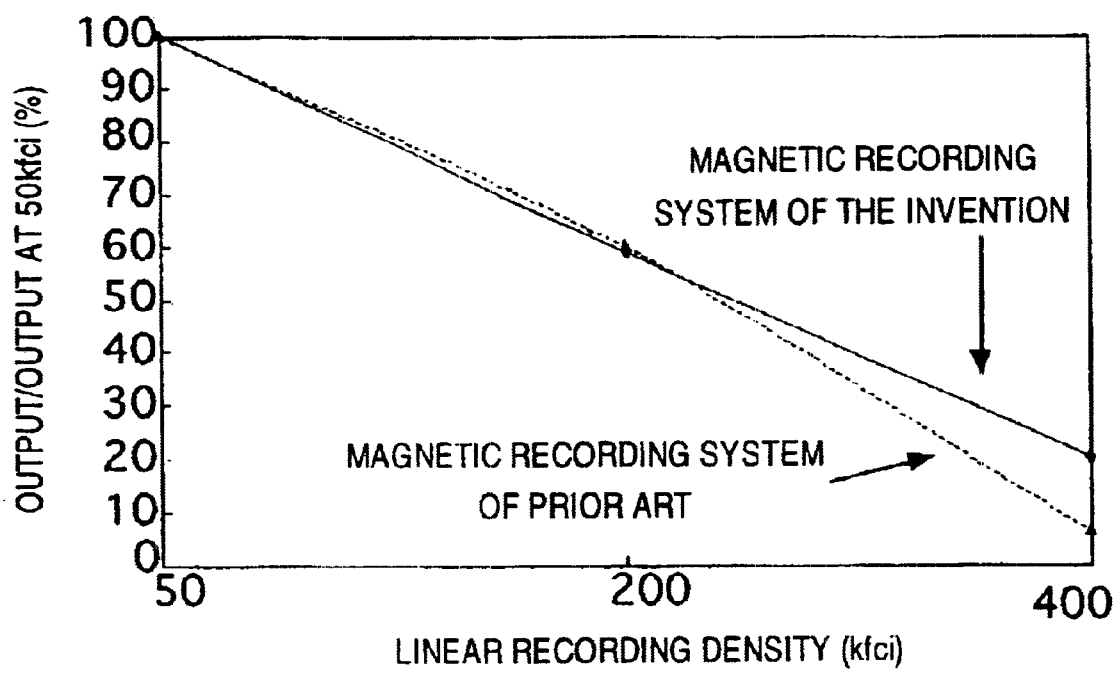
FIG. 10 shows results in the case where the recording density dependency of the resolution in the magnetic recording system in the embodiment 2 is compared with that of the conventional magnetic recording system.

Comparison results obtained by measuring the time-decay of the reproduction output and the recording and reproducing characteristics by using the magnetic recording system of the invention and the conventional magnetic recording system are shown. The magnetic recording system of the invention is a system comprising the medium using $SiO_2$ as an underlayer shown above and the recording/reproduction separation type head which is formed by combining an electromagnetic inductive type magnetic head for recording having a head gap length gl=0.2 $\mu$m and a magneto-resistance effect type head for reproduction having a shield interval of 0.2 $\mu$m. The spacing between the head and the medium is set to 30 nm. In the conventional magnetic recording system, the same head as that of the invention is used and the conventional medium in which the axis of easy magnetization of the particles is distributed in the plane and which is isotropic in the plane is used. As a thickness of magnetic layer, a particle diameter, and Mr·δ (=6.0 Tnm) and Hc (=250 kA/m) among the magnetic characteristics, almost the same values as those of the medium used in the magnetic recording system of the invention are used. However, since Ms=0.5T, the remanent squareness ratio Mr/Ms 0.7, Ku $1.4 \times 10^5$ J/m$^3$, and Ku·V/k·T=54, it is presumed that the thermal decay are worse than those of the medium used in the invention. FIG. 8 shows a time-decay of the reproduction output at a linear recording density of 400 kfci. It has consequently been found that the reproduction output deteriorates by 7% in the conventional magnetic recording system after 100 hours and that it hardly deteriorates in the magnetic recording system of the invention. Since the time-decay is larger as the magnetic recording density is higher, it is possible to presume that there is hardly a time-decay after 100 hours at the recording density of 360 kfci lower than that of 400 kfci of the invention. That is, the calculation results of the embodiment 1 preferably coincide with the experiment results. Subsequently, the recording and reproducing characteristics of the magnetic recording system are compared. FIG. 9 shows a dependency of the S/N ratio of the reproduction output to the noises on the recording density. It has, consequently, been known that although the S/N ratio of the magnetic recording system of the invention at the low recording density is lower than that of the conventional magnetic recording system, at a recording density of 300 kfci or more, the S/N ratio of the system of the invention is higher. It has also been found from the diagram that S/N=20 dB at the recording density of 360 kfci (magnetization transition length=70 nm) and is almost equal to the S/N ratio of the embodiment 1. That is, it has also been found from this result that the calculation results of the embodiment 1 preferably coincide with the experiment results. Further, in case of the recording density of 360 kfci, although the S/N=20 dB or more is necessary for the system, in the conventional system, the limit of the recording density is equal to 330 kfci and 10 Gigabits per square inch cannot be accomplished. However, in the system of the embodiment, the recording density is equal to 360 kfci and the recording of 10 Gigabits per square inch can be performed. FIG. 10 shows a dependency of the resolution on the recording density. The resolution denotes a value in which an output $E_{2f}$ of the high recording density is normalized by a reproduction output $E_{1f}$ at the low recording density (50 kfci). Although the reproduction output decreases in association with an increase in recording density, in the magnetic recording system of the invention, a decreasing rate is small. When the recording density is equal to 200 kfci or more, it has been found that the resolution as a ratio of the output $E_{1f}$ of the low recording density and the output $E_{2f}$ of the high recording density is higher than that of the conventional system. Particularly, when the recording density is equal to 360 kfci or more, since the resolution of 20% or more is necessary, the above conditions cannot be satisfied in case of systems other than the system according to the invention. It has consequently been found that the magnetic recording system of the invention is thermally stable and suitable for the high density magnetic recording in which the recording density is equal to 360 kfci or more, namely, the magnetization transition length is equal to 70 nm or less. Further, the time-decay and recording and reproducing characteristics of the reproduction output of the magnetic recording system using the medium in which the underlayer is made of $Al_2O_3$ are measured, so that results which are almost equivalent to those of the magnetic recording system using the medium in which the underlayer is made of $SiO_2$ are obtained. It has also been found that the system is thermally stable as compared with the conventional magnetic recording system and is suitable for the high density magnetic recording.

Embodiment 3

An embodiment 3 shows a comparison example examined while changing Mr/Ms for the embodiment 2. In a magnetic recording system of the embodiment 3, the same head as that of the embodiment 1 is used and as a medium, the same glass substrate, magnetic layer, and protection layer as those in the embodiment 2 are formed under substantially the same film forming conditions as those of the embodiment 2 except that a Zr or Al film having a thickness of 0.1 $\mu$m is provided as an underlayer. According to the medium formed by using Zr as an underlayer, the saturation magnetization is equal to Ms=0.60T, the residual magnetization measured by the VSM is equal to Mr=0.32T, and the remanent squareness is equal to Mr/Ms=0.53. According to the measurement by the same VSM, the coercive force is equal to 280 kA/m. The magnitude of the magnetic anisotropy constant Ku obtained by the magnetic torque method is equal to $1.7 \times 10^5$ J/m$^3$ and is larger than that of the conventional medium. The magnetic characteristics of the medium formed by using Al as an underlayer are almost the same as those of the medium using Zr as an underlayer. Subsequently, the value obtained by dividing the sum of the observation particle areas of the medium particles by the number of observation particles is set to the average area (=100 nm$^2$) of the crystal particles and Ku·V/k·T serving as a thermal stability factor is obtained by using the TEM (Transmission Electron Microscopy), so that it is equal to 66 at the room temperature (T=300K). Even in this magnetic layer, the medium in which the direction of the axis of easy magnetization of the magnetic particles of the magnetic layer is 3-dimensionally distributed is obtained in a manner similar to the embodiment 2. The time-decay of the reproduction output is examined in a manner similar to the embodiment 2, so that the output after the elapse of 100 hours is reduced by about 0.5% as shown in FIG. 8. Further, as a comparison example, the time-decay and S/N ratio of the reproduction output of the magnetic recording system using the same head as that of the embodiment 2 and the medium having substantially the same layer structure and formed under substantially the same film forming conditions as those in the embodiment 2 except that a Ti film having a thickness of 0.05 μm is used as an underlayer are measured. Although the magnetic characteristics of the medium used for comparison exhibit almost the same values, namely, Mr·δ=5.6 Tnm, Hc=240 kA/m, and Ku·V/k·T=75 as those in the embodiment 1 by the VSM measurement, Ms=0.87 and the remanent squareness is equal to Mr/Ms=0.4, so that the remanent squareness fairly deteriorates. Although the time-decay of the reproduction output is almost the same as that in the embodiment 2, since the noises increase in association with the deterioration of the output as shown in FIG. 9, the S/N ratio fairly deteriorates. It has, therefore, been found that in case of the remanent squareness is equal to 0.5 or less, it is not suitable for the high density magnetic recording.

According to the magnetic recording system using the magnetic recording medium in which the direction of the axis of easy magnetization of the magnetic particles in the magnetic layer of the invention is three-dimensionally distributed as mentioned above, in the case where the recording magnetization pattern in which the magnetization transition length of the magnetic recording medium is equal to 70 nm or less is recorded, a medium having high Ku and low Hc can be realized. Excellent characteristics for the S/N ratio, resolution, and thermal stability can be obtained.

What is claimed is:

1. A magnetic recording system comprising:
   a magnetic recording medium including
     a substrate,
     an underlayer formed on the substrate, and
     a magnetic layer formed on the underlayer, the magnetic layer being composed of magnetic grains; and
   a magnetic head including a recording unit and a reproducing unit;
   wherein the underlayer includes $SiO_2$ or $Al_2O_3$;
   wherein an orientation of an axis of easy magnetization of the magnetic grains is three-dimensionally distributed; and
   wherein a recording density of information which is recorded onto the magnetic recording medium is equal to 360 kfci or more.

2. A magnetic recording system comprising:
   a magnetic recording medium including
     a substrate,
     an underlayer formed on the substrate, and
     a magnetic layer formed on the underlayer, the magnetic layer being composed of magnetic grains; and
   a magnetic head including a recording unit and a reproducing unit;
   wherein the underlayer includes $SiO_2$ or $Al_2O_3$;
   wherein an orientation of an axis of easy magnetization of the magnetic grains is three-dimensionally distributed; and
   wherein the orientation of the axis of easy magnetization of the magnetic grains has a three-dimensional distribution defined by the following equation:

$$x^2+y^2+z_2/\sigma^2=1$$

where x is a component of the axis of easy magnetization in a track travelling direction of the magnetic recording medium,
   where y is a component of the axis of easy magnetization in a track width direction of the magnetic recording medium,
   where z is a component of the axis of easy magnetization in a medium thickness direction of the magnetic recording medium, and
   where σ is an arbitrary constant which controls the orientation of the axis of easy magnetization of the magnetic grains relative to the medium thickness direction.

3. A magnetic recording system comprising:
   a magnetic recording medium including
     a substrate,
     an underlayer formed on the substrate, and
     a magnetic layer formed on the underlayer, the magnetic layer being composed of magnetic grains; and
   a magnetic head including a recording unit and a reproducing unit;
   wherein the underlayer includes $SiO_2$ or $Al_2O_3$;
   wherein an average angle between a direction of an axis of easy magnetization of each of the magnetic grains and a surface of the magnetic recording medium is within a range of 20° to 30°; and
   wherein a recording density of information which is recorded onto the magnetic recording medium is equal to 360 kfci or more.

4. A magnetic recording system comprising:
   a magnetic recording medium including
     a substrate,
     an underlayer formed on the substrate, and
     a magnetic layer formed on the underlayer, the magnetic layer being composed of magnetic grains; and
   a magnetic head including a recording unit and a reproducing unit;
   wherein the underlayer includes $SiO_2$ or $Al_2O_3$;
   wherein an average angle between a direction of an axis of easy magnetization of each of the magnetic grains and a surface of the magnetic recording medium is within a range of 20° to 30°;
   wherein respective orientations of respective axes of easy magnetization of the magnetic grains have a three-dimensional distribution; and
   wherein the three-dimensional distribution of the respective orientations of the respective axes of easy magnetization of the magnetic grains is defined by the following equation:

$$x^2+y^2+z^2/\sigma^2=1$$

where x is a component of the respective axes of easy magnetization of the magnetic grains in a track travelling direction of the magnetic recording medium,
   where y is a component of the axes of easy magnetization of the magnetic grains in a track width direction of the magnetic recording medium,
   where z is a component of the axes of easy magnetization of the magnetic grains in a medium thickness direction of the magnetic recording medium, and
   where σ is an arbitrary constant which controls the respective orientations of the axes of easy magnetization of the magnetic grains relative to the medium thickness direction.

* * * * *